Patented Aug. 31, 1926.

1,597,808

UNITED STATES PATENT OFFICE.

FRANK T. LAHEY, OF AKRON, OHIO.

VULCANIZABLE PLASTIC MATERIAL.

No Drawing.    Application filed October 18, 1923. Serial No. 669,241.

This invention relates to new and useful improved vulcanizable material and to the vulcanized product which may be formed from such material.

The primary object of the invention is to provide a new and improved plastic material which may be calendered into sheet form or molded or otherwise formed into articles of any desired shape and vulcanized and which when so formed and vulcanized will provide a high grade product.

While my improved plastic composition is particularly adapted for use in manufacturing floor coverings, wall coverings and other sheet material, it is also well adapted for use in the manufacture of molded goods or any article usually composed wholly or in part of rubber or a similar material.

A further object is to provide a new and improved plastic rubber compound which is composed in part of rubber scrap and to thereby provide a vulcanizable material which may be manufactured at an exceptionally low cost.

A further object is to provide a new and useful method for using liquid latexes of rubber producing plants and to provide new and improved means whereby ground vulcanized fiber may be mixed with any latex, emulsified oil or emulsified oils and latexes to provide a vulcanized plastic material capable of being molded or otherwise formed into various articles or parts and which when subjected to vulcanization will provide a strong, durable product.

The above objects are accomplished and additional ends are attained by the new and improved composition hereinafter described, it being understood that the invention is adapted to be modified to suit various conditions and that changes and variations may be made or substitutions resorted to, which come within the scope of the claims hereunto appended.

In carrying out the invention any vulcanized rubber scrap may be used, including any vulcanized rubber compound, containing fillers, organic or inorganic compounds, minerals or cotton or linen or any other class of vegetable or mineral fibers or any other substances that are contained in any other product of which vulcanized rubber or semi-vulcanized rubber is a part.

The vulcanized rubber scrap is first ground or refined on a regular or ordinary rubber mill or other suitable refiner. During the process of grinding liquid latex is slowly added. The grinding or refining is then slowly continued until the rubber and the latex have been thoroughly mixed and the mass sheets from the rolls.

Sulphur may or may not be added to the mass depending upon the amount of free sulphur contained in the vulcanized rubber or ground scrap and upon the degree of hardness desired in the article to be formed.

To the plastic mass thus produced may be added oils, fats, waxes, fibers of any description and organic or inorganic fillers may be added if desired. If desired, emulsified oils may be thoroughly mixed with any liquid latex and added to the ground rubber during the milling process.

As a modification of the invention emulsified oils, or, emulsified oils mixed with a coagulant, may be added during the grinding process. If desired any phenolic condensation product may be used with or without the liquid latexes, emulsified oils, or, emulsified oils and liquid latexes in connection with any product containing semi-vulcanized or vulcanized rubber and milled or otherwise thoroughly mixed to provide a plastic mass which may be formed in the desired shape to produce a flexible, semi-rigid or rigid product.

Having thus described my invention what I claim as new and desire to secure by Letters Patent is:—

1. That process of producing a vulcanizable, plastic composition comprising first refining the rubber by grinding on a mill, then milling the refined rubber and adding liquid rubber latex during the milling operation.

2. That process of producing a vulcanizable plastic material which consists in taking ground rubber, milling and refining the same on a mill and adding liquid rubber latex during the milling operation.

3. That process of producing a vulcanizable plastic material which consists in taking ground vulcanized rubber, milling and refining the same on a mill and adding liquid rubber latex and emulsified oils during the milling operation.

In testimony whereof I have hereunto set my hand.

FRANK T. LAHEY.